June 9, 1925.
W. MILLER
BUMPER FOR AUTOMOBILES
Filed Sept. 16, 1924
1,540,945
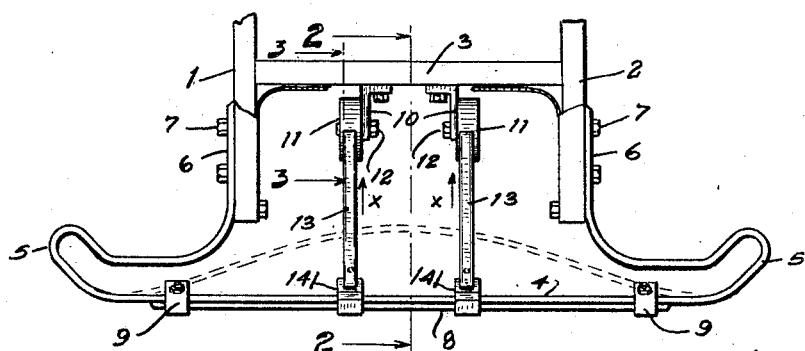
Fig. 1.
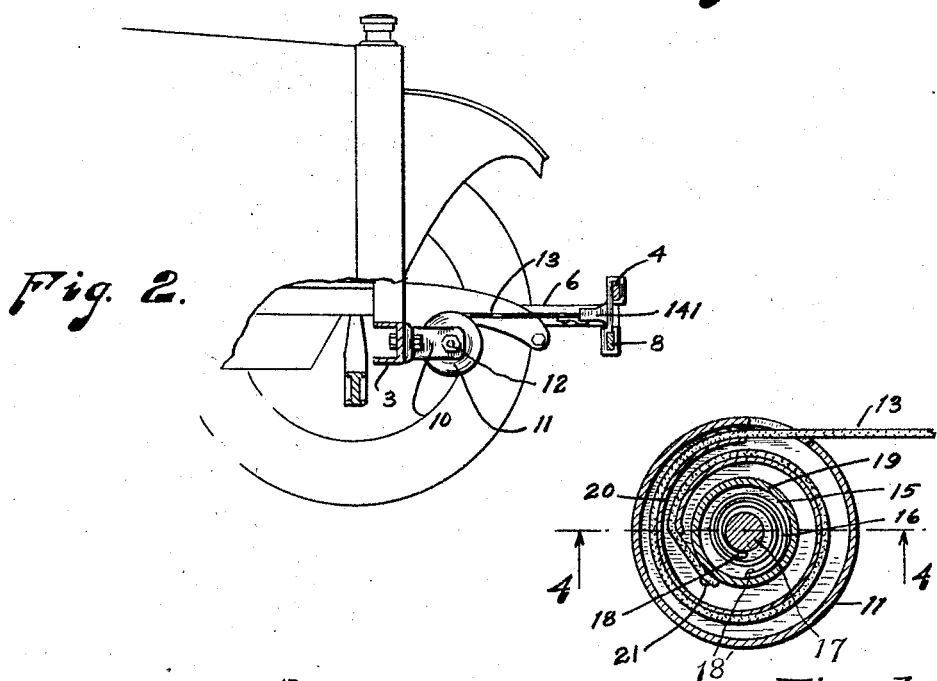
Fig. 2.
Fig. 3.
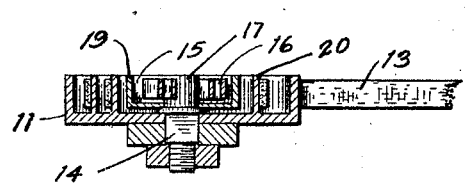
Fig. 4.
Inventor
Wright Miller.
By A. J. O'Brian
Attorney Patented June 9, 1925.

1,540,945

UNITED STATES PATENT OFFICE.

WRIGHT MILLER, OF DENVER, COLORADO.

BUMPER FOR AUTOMOBILES.

Application filed September 16, 1924. Serial No. 738,015.

*To all whom it may concern:*

Be it known that I, WRIGHT MILLER, a citizen of the United States, residing at the city and county of Denver and State of Colorado, have invented certain new and useful Improvements in Bumpers for Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in bumpers for automobiles.

It is customary to equip automobiles with spring bumpers as a protection against injury, due to collisions with other automobiles and with stationary objects. Such bumpers are very effective, but they have one objectionable feature, which I will point out, and for which I have provided a remedy.

The ordinary type of spring bumper consists of one or more spring steel bars extending transversely of the car and so constructed that it will yield when force is applied to it.

It is well known that if an automobile equipped with bumpers of the ordinary type collides with another machine or object, the momentum of the automobile and the inertia of the object struck cause the spring bumpers to become flexed to a considerable extent, whereby a large amount of energy is stored, which is given off by the recoil. I have found that when an automobile has finally been brought to a stop after striking another car or object, the energy stored in the spring bumper is sufficient to hurl the object away with sufficient force to damage it. As an example, let us suppose that an automobile equipped with resilient spring bumpers collides with another automobile, striking the latter on the side. The inertia of the car struck is usually sufficient to flex the bumpers to their maximum without itself being moved. When the automobile carrying the bumper is stopped, there exists between the two automobiles a strong force which is sufficient to overturn the automobile that was struck. We are therefore confronted by a situation in which the colliding automobile has been brought to a full stop, before the automobile struck has been turned over or seriously damaged, but a force exists in the bumper which is liberated in the recoil and which is sufficient to overturn the struck automobile after the colliding automobile has come to a stop, with the result that injury and damage is often inflicted, which could have been prevented if the spring bumpers were restrained from exerting their force suddenly. Let us now assume that the bumpers are equipped with means which permits them to flex freely when a collision takes place, but which holds them in flexed position and permits them to straighten out very slowly. It is apparent that the energy stored in the bumper when released slowly will not exert sufficient force to overturn the automobile struck. Therefore, when such retarding means are provided, the bumper will exert its protective function as well as ever, but it will be prevented from recoiling suddenly and thereby deprived of power to cause damage after the colliding automobile has come to a stop.

My invention resides in the novel combination formed by providing a recoil retarding device between the bumper and the automobile body so that after the bumper has been flexed, it will be permitted to resume its normal shape gradually, thereby removing the possibility of causing damage by the sudden release of energy that would otherwise take place upon the recoil of the spring.

For the purpose of more clearly describing my invention, and in order that it may be most readily understood, I have illustrated one embodiment thereof on the accompanying drawing, to which reference will now be made, and in which:

Fig. 1 is a top plan view showing a portion of an automobile chassis with a spring bumper of ordinary construction attached thereto. I have also shown two recoil retarding devices in place between the bumper and the chassis;

Fig. 2 is a section taken on line 2—2, Fig. 1, and shows in addition a portion of the engine hood and the radiator, which have been broken away in Fig. 1;

Fig. 3 is a section taken on line 3—3, Fig. 1; and

Fig. 4 is a section taken on line 4—4, Fig. 3.

Numerals 1 and 2 represent the forward ends of the chassis frame and 3 a transverse frame member. The bumper may be of any ordinary construction, but has been shown as consisting of a flat spring steel bar 4 which has reverse bends at 5 and whose ends 6 are secured to the front ends of the chassis frame members 1 and 2 by means of bolts 7. An auxiliary bar 8 is secured to the bar 4 by means of clips 9. The bumper used for the purpose of illustration is old and well known and forms no part of this invention, except in so far as it constitutes an element of my novel combination.

The normal position of the bumper is indicated by full lines in Fig. 1 and the position of maximum flexure is indicated by dotted lines.

Secured to the transverse member 3 are brackets 10 to which the recoil retarding devices 11 are secured by means of bolts 12. These devices may be made in any suitable manner and are so constructed that the webbing 13 is acted upon by a spring which tends to draw the same into the casing in the direction of arrows X. If, however, a force is applied tending to move the webbing in a direction opposite to that indicated by the arrows X, the webbing will be subjected to a frictional force that permits it to move very slowly only. The ends of the webs 13 are secured to the bumper by means of suitable clamps 14 and serve to prevent the bumper from suddenly moving back to its normal position thereby preventing the recoil from causing damage.

My retarding devices may be constructed in any suitable manner, but as an illustration of one practical embodiment, I have shown a specific construction in which the casing 11 is secured to a bracket 10 by means of a bolt 12 which has a square section 14. This bolt clamps the casing to the bracket and prevents relative rotation of the two. A cuplike member 15 is rotatably mounted on the bolt 12 within the casing. A spring 16 has one end 17 secured to the bolt at 18 and the other end secured at 18′ to the inside of the flange 19. Projecting from the inner surface of the casing 11 is a spiral flange 20 which extends 360 degrees or more. A strong fabric web 13 rests on the spiral flange and has its inner end connected to flange 19 at 21. Let us assume that the parts are in the position shown in Fig. 3 and that the spring 16 is under tension. Now remove any tension from the web 13. The spring 16 will operate and rotate the member 15 and wind the web 13 onto the flange 19. If a force is now applied to the web for the purpose of causing the same to move outwardly there will be a snubbing action which will retard the movement of the web. When the end of the web is secured to the spring bumper, the spring 16 will take up any slack that would otherwise be present when the bumper is flexed. When the bumper begins its recoil, however, the web 13 will permit it to move at a comparatively slow rate only, the rate of recoil being retarded to such an extent that it can cause no damage.

Having now described my invention, what I claim as new is:

1. The combination with a spring bumper of an automobile, of a recoil retarding device located between the bumper and the chassis of the car.

2. A device for reducing damages due to the collision of automobiles, comprising, in combination, an automobile chassis frame having a transverse member near one end, a spring bumper secured to said frame, said bumper being adapted to be flexed, and a recoil retarding device between said bumper and the transverse member.

In testimony whereof I affix my signature.

WRIGHT MILLER.